May 24, 1949.  B. H. BUNN  2,471,304
TYING MACHINE FOR ELONGATED PACKAGES
Original Filed Dec. 10, 1941  7 Sheets-Sheet 1
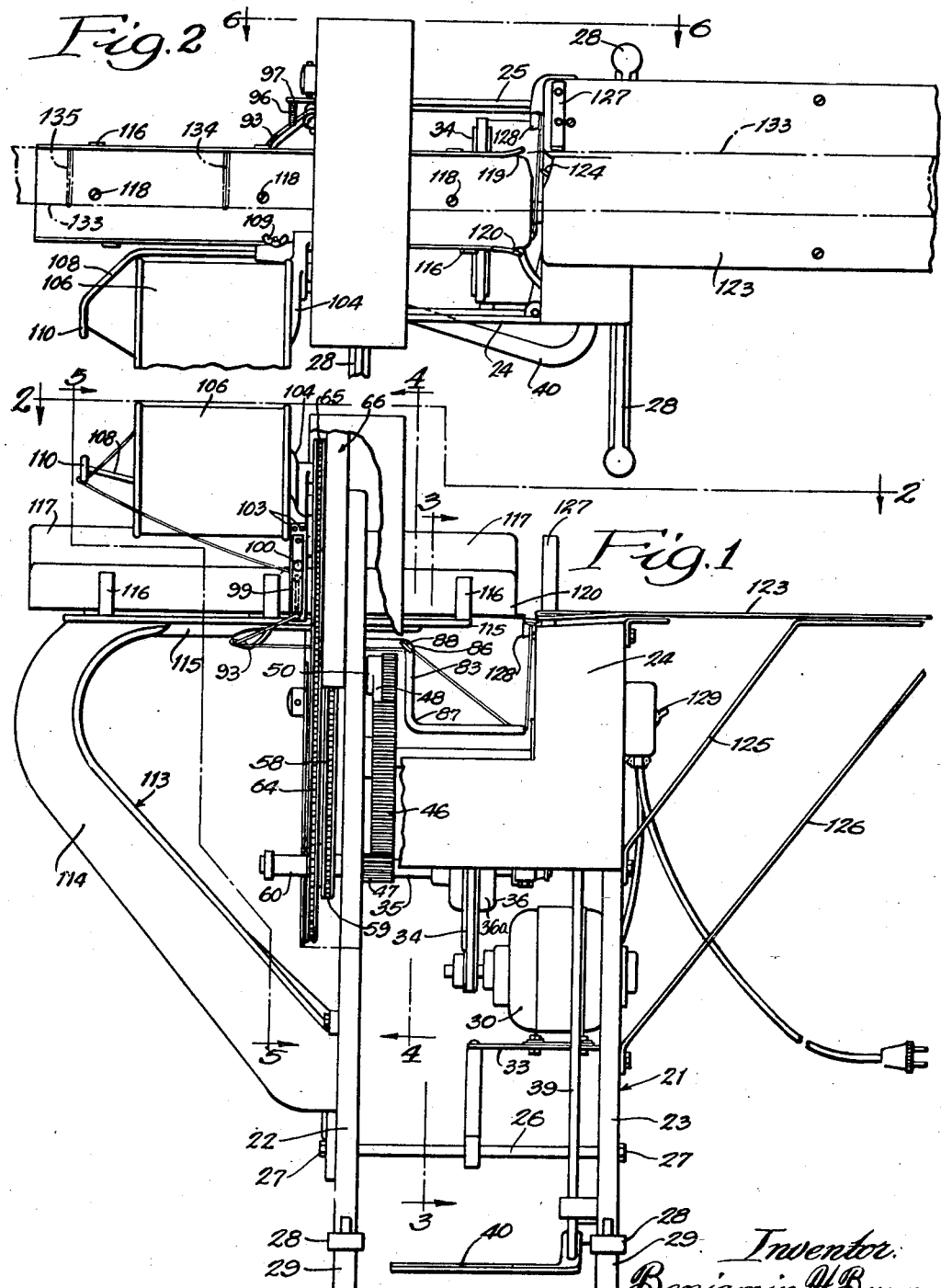

May 24, 1949.    B. H. BUNN    2,471,304
TYING MACHINE FOR ELONGATED PACKAGES
Original Filed Dec. 10, 1941    7 Sheets-Sheet 2
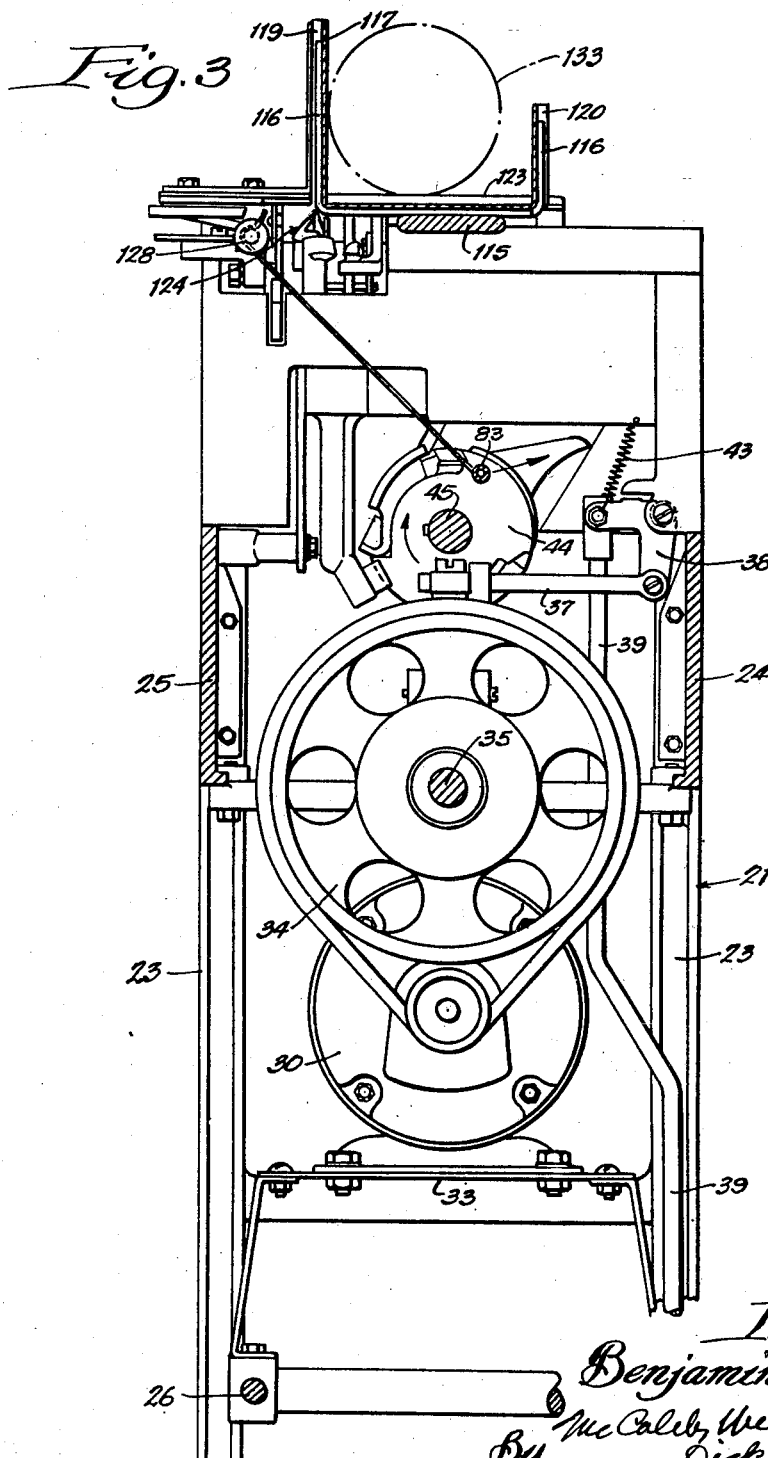

May 24, 1949.  B. H. BUNN  2,471,304
TYING MACHINE FOR ELONGATED PACKAGES
Original Filed Dec. 10, 1941  7 Sheets-Sheet 3
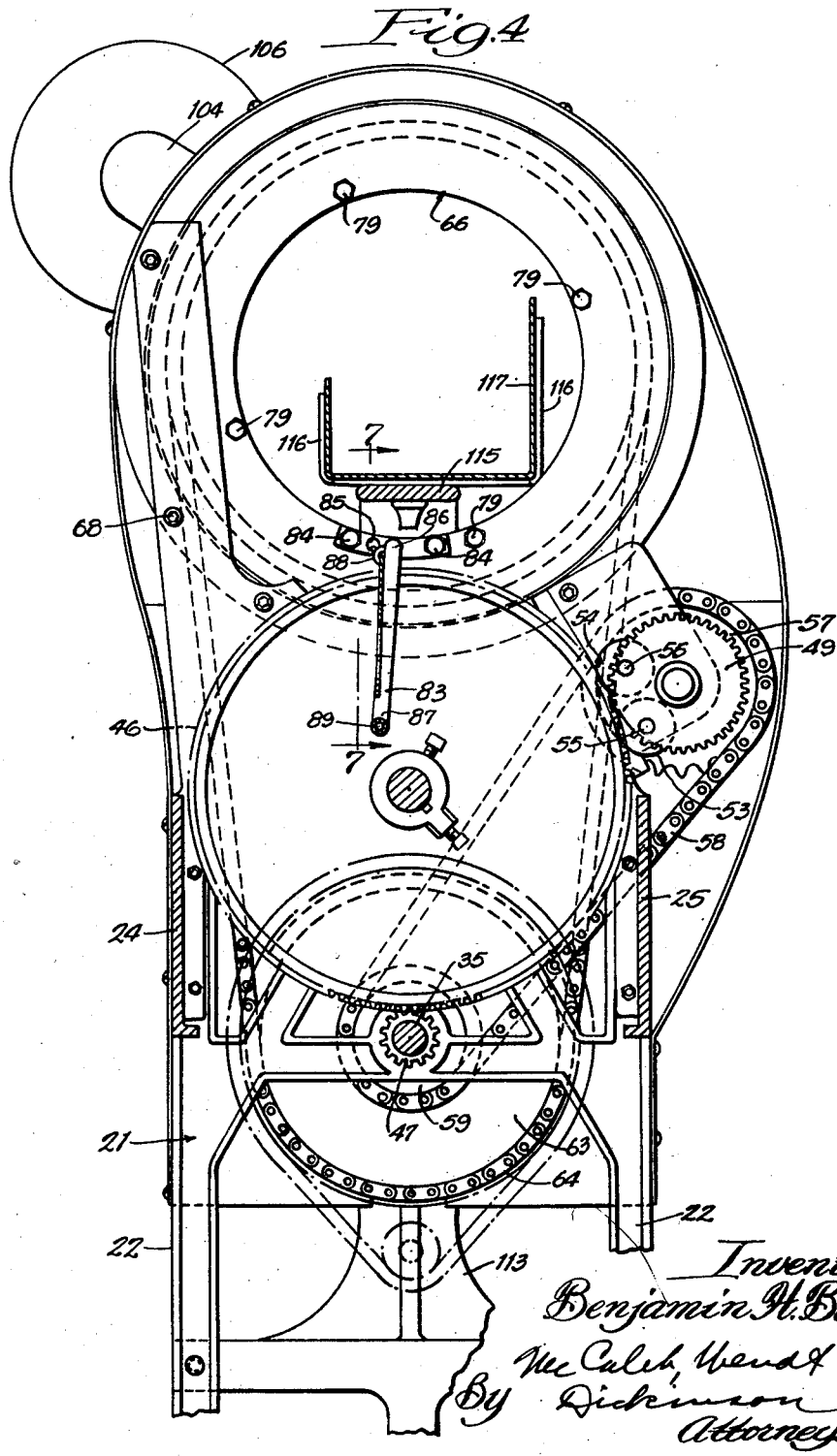

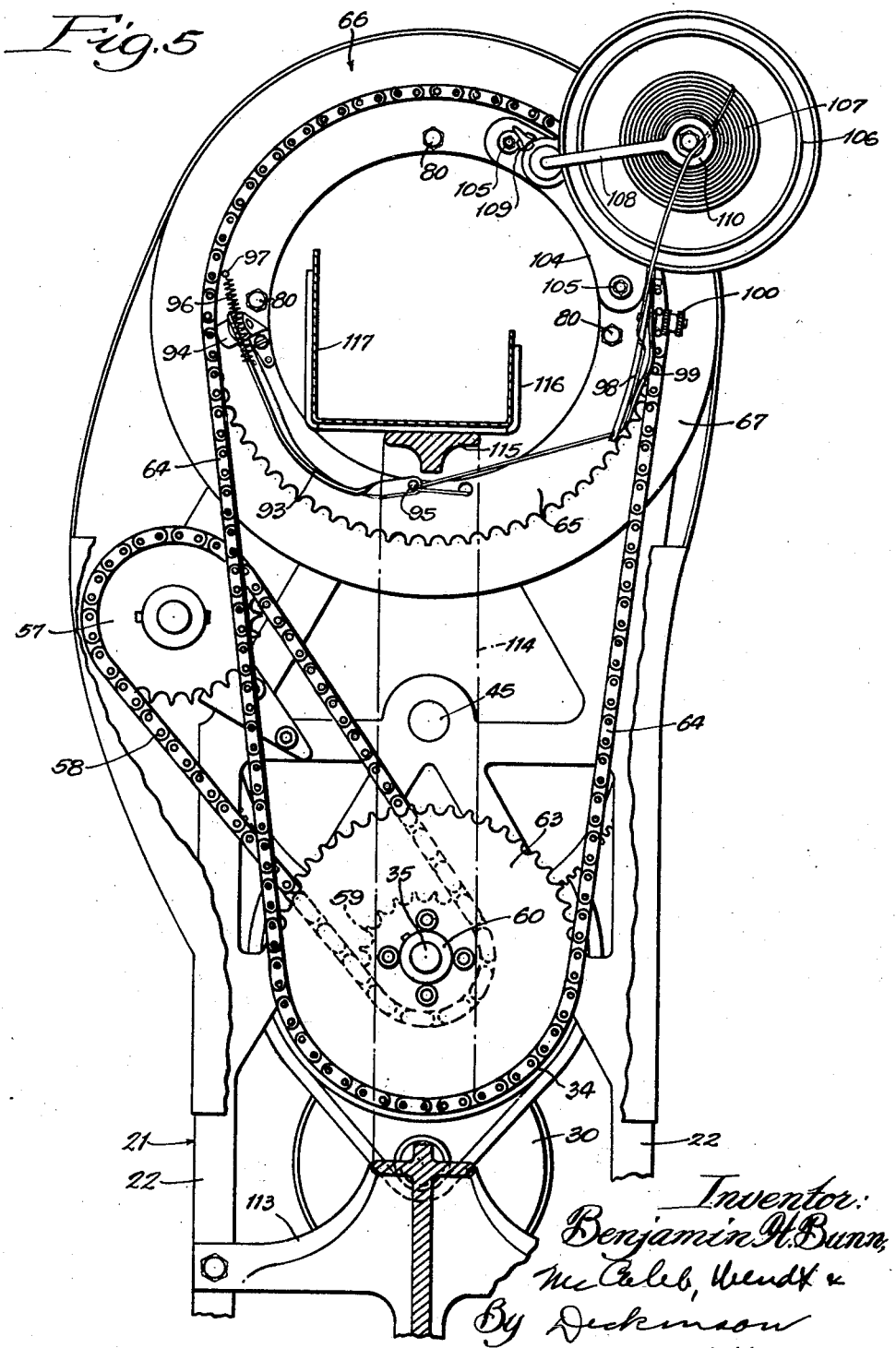

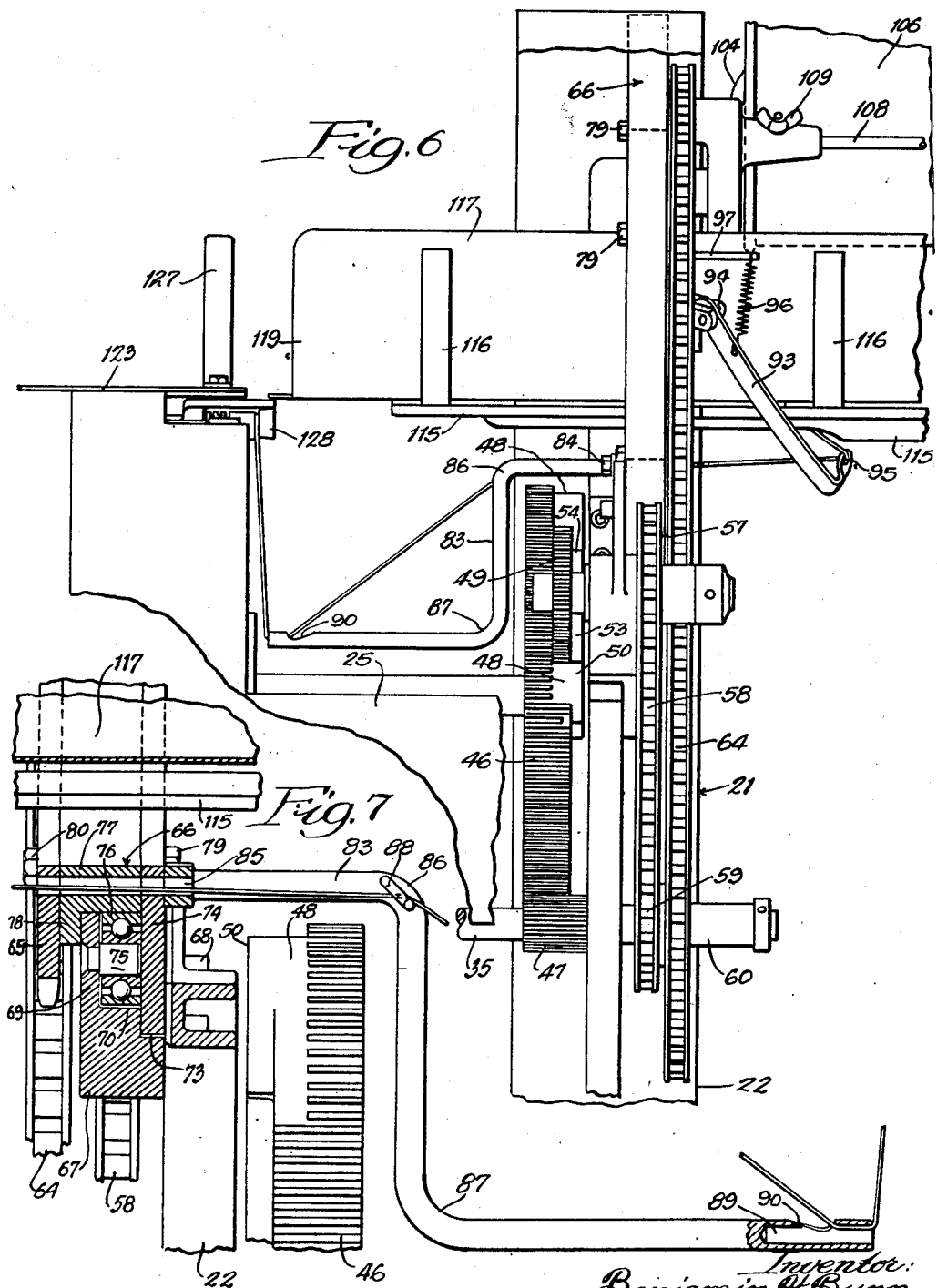

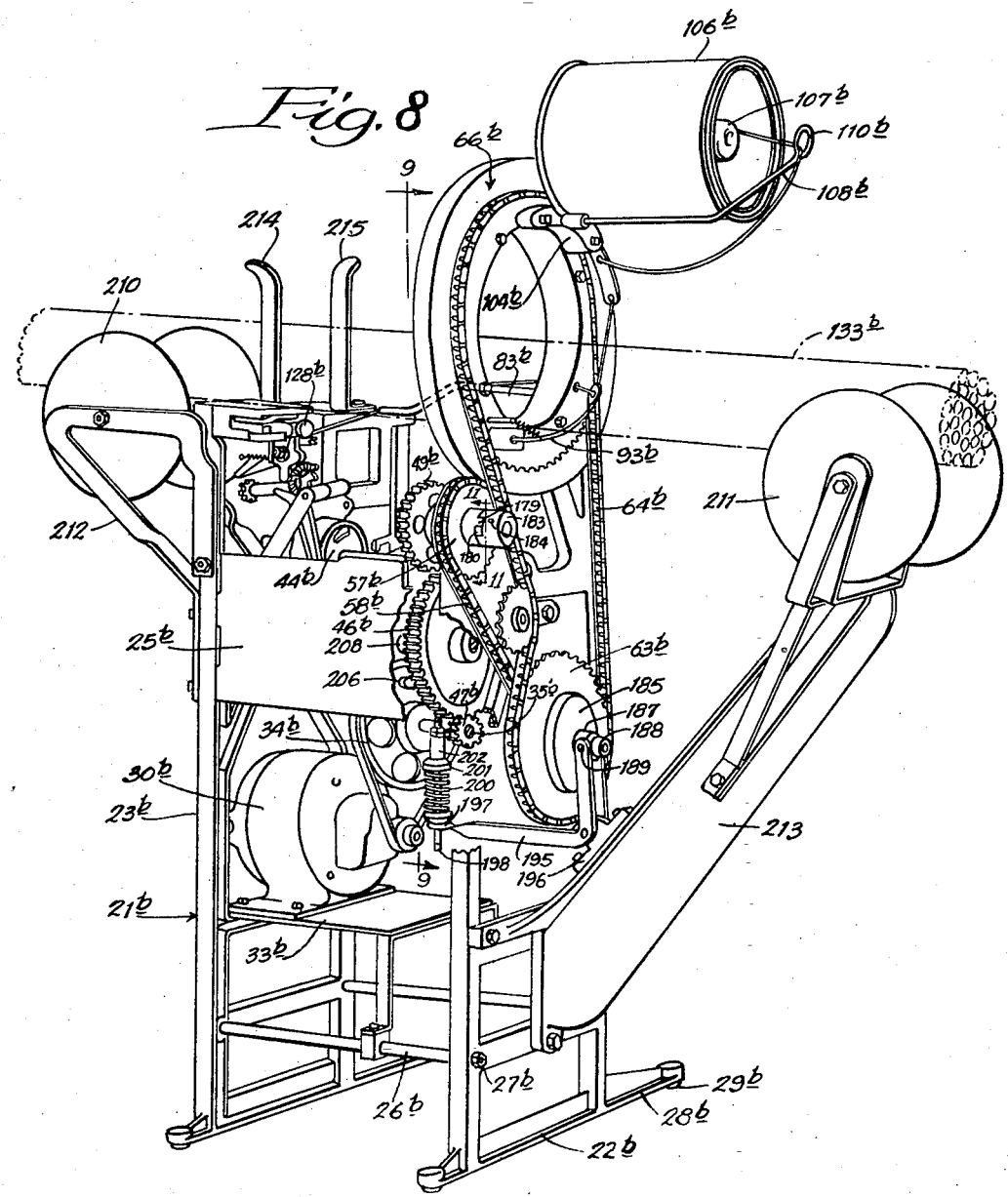

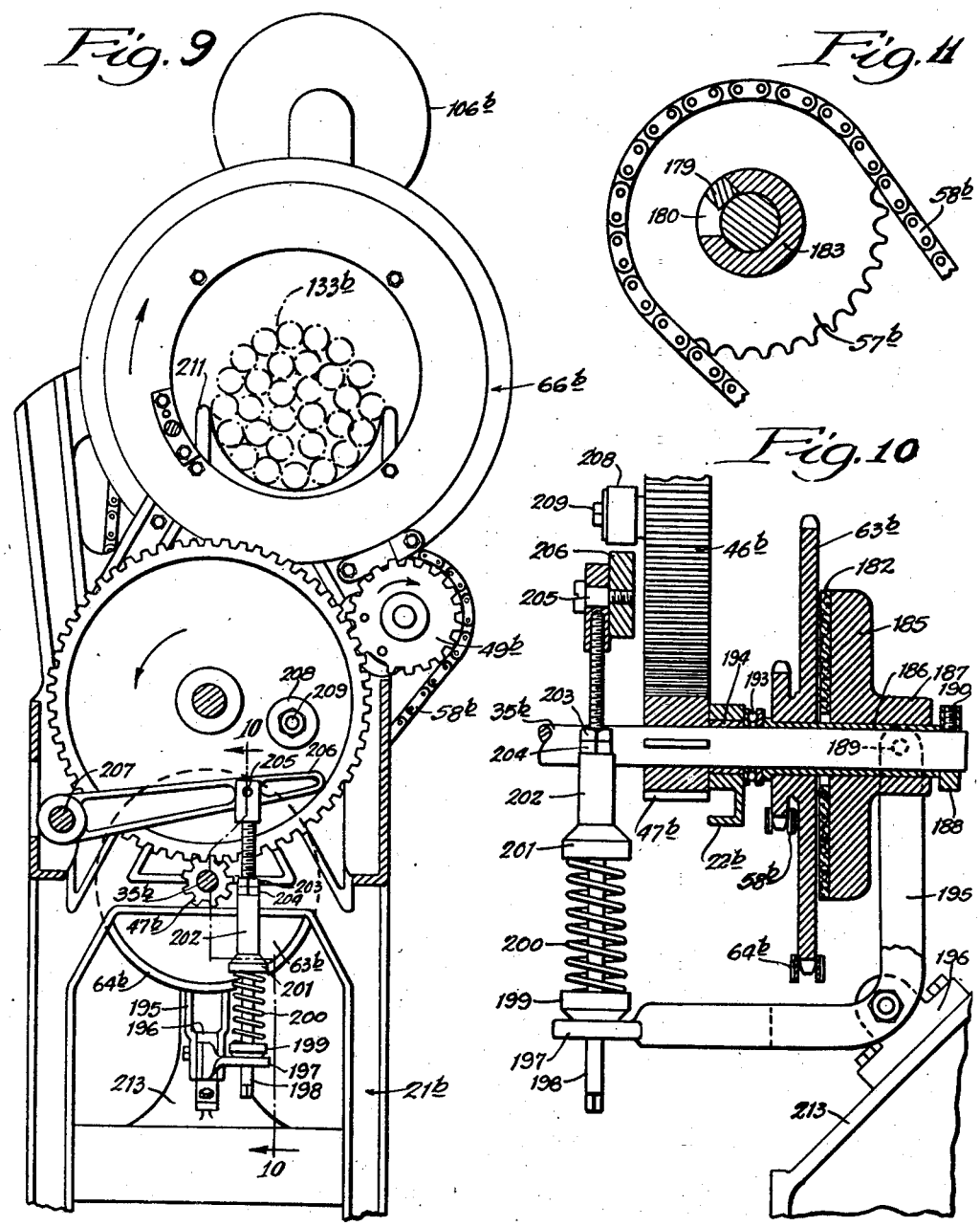

Patented May 24, 1949

2,471,304

UNITED STATES PATENT OFFICE 2,471,304

TYING MACHINE FOR ELONGATED PACKAGES

Benjamin H. Bunn, Chicago, Ill., assignor to B. H. Bunn Company, Chicago, Ill., a corporation of Illinois Original application December 10, 1941, Serial No. 422,317. Divided and this application March 7, 1945, Serial No. 581,484

14 Claims. (Cl. 100—31)

My invention relates to tying machines for elongated or rod-like packages or bundles, and contemplates more especially tying machines for applying one or more wraps of twine circumferentially about rod-like packages or bundles at spaced intervals therealong and knotting or otherwise securing together the ends of the twine at each wrap interval.

The present application is a division of my prior application, Serial No. 422,317, filed December 10, 1941, on Tying machines for elongated packages, issued April 3, 1945, as Patent No. 2,372,763.

Package tying machines in general use, as exemplified by the tying machines disclosed in my patents, Nos. 1,606,290, of November 9, 1926, and 1,994,453, of March 19, 1935, permit of wrapping such rod-like packages or bundles only near their respective ends, because of the necessarily rather limited distance between the plane of the twine wrapping and the mounting hub of the twine wrapping crank arm. Greatly to increase the length of the horizontal eccentric portion of the twine wrapping crank arm, to increase the distance between the crank hub and the wrapping plane, would leave the twine laying end of the twine arm too far from its support and would give rise to an objectionable whipping action of the twine arm and an inaccuracy of the location of the payout end of the twine in its normal position. It would leave the so-called "island" portion of the work table (the portion of the table which has to be suspended to permit the twine arm to pass around it) too distant from its support.

Not only has it not been feasible to employ the twine crank arm type of tying machine to such wrapping of rod-like packages, even with simple modifications thereof, but it has not been feasible to employ the so-called needle arm type of tying machine. This is partly because the needle arm type of machine is inherently limited to a single wrap of twine, and partly because the entire rod-like package or bundle would have to be shifted transversely in and out for each wrapping and knotting.

Among the objects and features of my invention are the following:

The twine is wrapped about a rod-like package without the objection of supporting the twine wrapping arm wholly from its distant hub or mounting.

A plurality of wraps of twine can be applied about the package at any station therealong and the ends of the twine knotted together.

In some forms of my invention, the rod-like package or bundle to be tied may be of indefinite or unlimited length, or in fact continuous (as, for example, where the tying machine may directly receive a continuous length of the material to be wrapped as it comes from the machine which makes the material, such as a bundle of continuous strips coming from a battery of extrusion molding presses); or, rod-like packages of finite length may be fed end-to-end to the tying machine. Whether the article or bundle to be wrapped be of limited or unlimited length, it may be passed continuously into, through and out from the machine as a more or less continuous operation.

Any desired uniform or non-uniform spacing may be effected between the wrappings.

Long loose pieces of material may be bundled quickly and easily by virtue of the compacting action of the tying machine. Or the bundle may, in whole or in part, be given its desired form by the support for the component pieces.

Even where the twine is supplied to the machine axially and at a great distance from the wrapping plane, the twine arm is not supported and rotated from a correspondingly distant mounting and drive, but instead is supported from a mounting, and rotated by a drive applied, close to the payout end of the twine arm. And also what might (by comparison with the type of tying machine disclosed in my above mentioned patents) be termed the "island" portion of the work support is supported quite immediate the twine passing gap between it and the stationary portion of the support.

For the easy longitudinal progress of the work through the machine, it is, in some forms of my invention, supported by deeply grooved rollers which minimize friction and yet help confine a bundle of strips to an approximation of the desired contour of the tied bundle.

Among the articles which may be tied, or tied into bundles, by the tying machines of my invention are strands of such synthetic materials as "nylon," strips, rods or tubes of various materials, tubular insulation of the type known to the radio industry as "spaghetti," sausage, or elongated rolls of sheet material, and the like. The tying machines of my invention may also be employed for tying rod-like packages which have first been wrapped in paper or other sheet material. Another example of the use of my machine is the tying together at intervals of a long bundle of mop yarns, later to be cut at intervals into the yarn units for mop heads.

These and other features and advantages of my invention are set forth in the following description, and are illustrated in the accompanying drawings.

In the drawings of which there are seven sheets:

Fig. 1 is a front elevational view of a package tying machine embodying my invention;

Fig. 2 is a plan view of the machine illustrated in Fig. 1, taken on the plane of the line 2—2 of Fig. 1, a portion of the base and of a twine holder being broken away;

Fig. 3 is an enlarged vertical section taken on the plane of the line 3—3 of Fig. 1, the lower portion of the frame being broken away;

Fig. 4 is a similar vertical section taken on the plane of the line 4—4 of Fig. 1;

Fig. 5 is a similar vertical section taken on the offset planes of the broken line 5—5 of Fig. 1;

Fig. 6 is a further enlarged fragmentary rear view looking in the direction of the arrows 6—6 of Fig. 2;

Fig. 7 is a further enlarged fragmentary vertical section taken on the offset planes of the broken line 7—7 of Fig. 4;

Fig. 8 is a view in perspective of a further modified form of package tying mechanism embodying the invention;

Fig. 9 is an enlarged fragmentary vertical section taken on the plane of the line 9—9 of Fig. 8;

Fig. 10 is an enlarged fragmentary section taken on the plane of the line 10—10 of Fig. 9; and Fig. 11 is an enlarged fragmentary section taken on the plane of the line 11—11 of Fig. 8.

Referring to the drawings in detail, and considering first the embodiment illustrated in Figs. 1 to 7 inclusive, it may be pointed out that in the main the knotting mechanism and the operating facilities therefor are substantially the same as those illustrated in my Patents Nos. 1,606,290 and 1,994,453. The present specification therefore, for the purposes of brevity and simplicity, is written with the assumption that the reader is familiar with the general principles of operation of my tying machines as set forth in the above mentioned patents.

The machine illustrated in Figs. 1 to 7 inclusive is mounted on a main frame 21 which comprises cast iron end frame members 22 and 23, which are connected by front and rear plates 24 and 25. A pair of rods 26 connect the lower ends of the end frames, being secured thereto by nuts 27 threaded onto the ends of the rods. The end frame members are formed with laterally extending support portions 28 which have at their outer ends, supporting feet 29.

A motor 30 is mounted on a motor support plate 33 secured to the frame, the motor having speed reducing driving connection as by means of a V-belt, with a pulley 34 which is journaled on a shaft 35. The shaft 35 is journaled in the frame, and the pulley 34 is adapted to be connected, as by means of a clutch 36, to the shaft 35.

The clutch 36 is manually engaged and automatically disengaged to effect a time cycle and then to disconnect the driven parts from the motor. The clutch 36 comprises a clutch element 36a which is keyed upon shaft 35 and is normally urged into frictional driving engagement with the side face of the pulley 34 by a spring (not shown). In order to disconnect the shaft 35 from the pulley 34, it is necessary to retract the disc or clutch element 36a against the tension of the spring. The particular mechanism by which engagement and disengagement of the clutch is effected is more fully described hereinafter.

The clutch is operated, by a clutch lever in a manner similar to that of my Patent No. 1,606,290, by means of a slip link 37 connected to one arm of a bell crank lever 38 pivoted on the frame. The other arm of the bell crank lever is connected, by means of a link 39, to a foot treadle 40. A coil spring 43 holds the link 39 and its connected foot treadle normally in raised position, thereby moving the slip link 37 into the path of a cam, not illustrated, on the main cam block 44 to move the clutch to inoperative or released condition. Depressing the foot treadle withdraws the slip link 37 and thereby actuates the clutch, which remains engaged for one complete cycle of operation, being restored to inoperative condition by the action of the cam on the main cam block 44 in a manner similar to that described in my Patent No. 1,606,290.

The cam block 44 is keyed to a shaft 45 journaled in the frame, this cam shaft also having secured thereto the gear 46 which is in constant mesh with a drive pinion 47, keyed to the clutch shaft.

The gear 46 it will be noted has a mutilated or interrupted portion 48 along one side only thereof, the other side of the gear, with which the pinion 47 is in mesh, being uniformly toothed throughout its periphery. The mutilated side of the gear engages a wrapping head drive gear 49, which has a rather narrow face and is operatively disconnected from the gear 46, when the interrupted part of that gear is opposite it. A flange 50 projects laterally from the mutilated side of the gear 46 for a distance which may be slightly less than the arcuate length of the mutilated or interrupted portion of the gear 46. This flange engages a pair of rollers 53 and 54 (see Fig. 4) journaled on studs 55 and 56 which project laterally from the gear 49. The rollers ride on the flange 50 during the period when the wrapping head drive gear 49 is over the interrupted portion of the gear 46 to prevent the wrapping head drive gear from turning at such times.

A chain drive sprocket 57 is journaled co-axially with the gear 49 and is secured thereto to rotate therewith. A drive chain 58 passes around the sprocket 57 and around a chain driven sprocket 59 mounted on a hub 60 which is journaled on the clutch shaft 35. A second, larger chain sprocket 63 also is secured to the hub 60 and a drive chain 64 passes around this larger sprocket and around a chain sprocket ring 65 carried by a wrapping head 66.

The proportions of the chain sprockets 57 and 59 and 63 and the sprocket ring 65 are such, in relation to the wrapping ring drive gear 49, and, in turn its ratio to the toothed portion of the mutilated side of the gear 46 which it engages; as to rotate the wrapping head 66 a predetermined number of complete revolutions, determined by the number of wraps of twine desired around a package, for each complete rotation of the mutilated gear 46, constituting one complete cycle of the machine.

The construction of the wrapping head is illustrated in Figs. 1, 4 and 7. An annular mounting ring 67 is secured to the upper portion of the end frame member 22 as by socket-head cap screws 68. The transverse sectional shape of the mounting ring is shown in Fig. 7, and comprises an inwardly projecting roller support flange 69, a step 70 to provide a roller housing, and a second step 73 to receive a clamp ring 74.

A plurality of roller support studs 75, for example four or six, are secured in openings in the flange 69 as by riveting, these studs each being adapted to receive, with telescoping fit, the inner race or hub member of a ball bearing roller 76. The periphery of the outer roller race or rim member of the rollers projects slightly inwardly beyond the inner edge of the flange 69 to have rolling, supporting contact with a twine arm support ring 77.

The ring 77 has an outwardly extending flange 78 which is adapted to engage the roller support flange 69 to prevent endwise movement of the ring, and serves also as a spacer for the sprocket ring 65, which is mounted against the outer face of this flange 78.

The clamp ring 74 is mounted on the opposite face of the wrapping head ring from the sprocket ring, and this entire rotating assembly, including the sprocket ring 65, the twine arm support ring 77, and the clamp ring 74, is secured together by through-bolts 79 which pass through aligned holes in all of these component members and may be threaded into the clamp ring, or secured with nuts 80 as desired.

A twine arm 83 (see Figs. 4 and 7) has an arcuate base portion mounted beside the inner opening of the clamp ring 74 and is secured thereto as by cap screws 84. A twine opening 85 in the twine arm base adjacent to the twine arm is in register with aligned openings through the clamp ring, the twine arm support ring, and the sprocket ring 65, to provide a passage for the twine through the wrapping head. The twine arm is bent at approximately 90° at 86 and at 87, and is provided with a twine guide 88 (see Fig. 7). The outer or free end of the twine arm has an axial hole 89 therein, with a lateral opening 90 through which the twine passes during a wrapping operation.

A twine slack take-up is mounted on the opposite side of the wrapping head from the twine arm, and comprises an arm 93 of light strap metal, pivoted in a bracket 94 mounted on the sprocket ring 65, and having a twine opening 95 in the outer or free end thereof. A light coil spring 96 is held in tension between the arm and a pin 97 secured to the sprocket ring to urge the slack take-up arm outwardly as illustrated in Fig. 6. The slack take-up is somewhat similar to that disclosed in my Patents Nos. 1,606,290 and 1,994,453 referred to previously herein, as is also a twine tensioning device 98 which comprises a relatively non-flexible member (see Figs. 1 and 5) having a pair of spaced openings therein, the twine being adapted to be threaded through these openings with a reach of the twine between the openings engaged by a lightly tensioned leaf spring 99 to control, with adjusted force, the withdrawing tension of the twine. The amount of pressure of the spring at its point of contact with the twine is controlled by a thumb nut 100 bearing on the spring. The twine tensioning member is secured, as by machine screws 103, to the base of a twine supply support member 104, which in turn is secured to the sprocket ring 65 as by cap screws 105.

The support 104 has mounted thereon a twine container 106 which is adapted to receive and support a supply of twine 107. A twine guide 108 is adjustably mounted in a hole in the base of the support 104, and is secured in adjusted position therein by a thumb screw 109. The twine guide is bent at right angles to overlie the container, its outer end being formed into a guide ring 110 which may be positioned over the twine container to guide the twine from the supply to the tensioner, whence it passes through the slack take-up to the twine arm.

A package support bracket 113, which may be of cast iron, is bolted to the end frame 22 and comprises an upwardly and outwardly slanting portion 114, see Figs. 1 and 5, and an upper portion 115 which is curved back toward the machine and extends horizontally through the wrapping head 66. The top surface of this upper portion is flat and has secured thereto a plurality of rectangular U-shaped brackets 116. A package support channel member 117, also of rectangular U-shape, is of a size to fit snugly within the brackets 116 to be supported and reinforced thereby. The package support channel 117 and the reinforcing brackets 116 may be secured to the supporting bracket 113 by machine screws 118, see Fig. 2.

The package support channel extends to just short of the transverse plane defined by the end of the twine arm 83 during a wrapping operation. The sides of the channel member 117 are flared outward slightly as at 119 and 120 to prevent their catching on a package during a sliding movement of the package between successive wrapping operations.

The top surface of the horizontal bottom web of the package support channel 117 is at the same level as the top surface of a package support table 123 which overlies the knotting mechanism indicated generally by the numeral 124. The package support table 123 is supported from the frame 21 at its inner end by angle brackets 125 and at its outer end by brackets 126.

An angle bracket 127 is mounted on top of the table 123 with a vertically extending leg thereof located substantially in longitudinal alignment with a side of the package support channel 117. This bracket serves as a guide, and as a support for a package against lateral displacement under the action of the twine during a wrapping operation.

The operation of the machine illustrated in Figs. 1 to 7 inclusive is as follows:

Assuming that a supply of twine is in position in the twine container 106, the twine is led through the twine guide ring 110 and thence through the tensioning device 98, opening 95 in the slack take-up 93, through the twine guide 88, through the opening 89 in the end of the twine arm 83, and is inserted between the spring held parts of the twine catcher 128 to be retained thereby.

The motor 30 is energized as by means of a switch 129, and operates continuously during the time the machine is in condition for use, and the V-pulley 34 also rotates continuously, while the clutch shaft 35 operates intermittently when driven from the pulley 34 through the clutch 36.

A package 133, outlined in dot and dash lines in Figs. 2 and 3, is placed in the channel package support 117 to extend onto the table 123, the package or bundle, preferably being held by the operator against the rear wall of the channel support and also against the vertical leg of the angle bracket 127.

Upon depressing the treadle 40 the link 39 and bell crank lever 38 act to withdraw the slip link 37 from between the clutch operating lever and the cam on the cam block 44, thereby causing the clutch element 36a to engage the pulley 44 on shaft 35 and rotate the latter through one complete revolution of the cam block, or in other words until the clutch release cam on the cam block again engages the slip link to move the clutch lever to releasing position.

As above pointed out, the number of revolutions made by the twine arm during a wrapping cycle is determined by the resultant or combined ratios of (1) the wrapping head drive gear 49 to the unmutilated portion of the gear 46, (2) the sprockets 57 and 59, and (3) the sprocket 63 and the sprocket ring 65. In the machine illustrated, while the exact ratios of these gears and sprockets have not been drawn to exact dimensions, the resultant ratio may be considered as three to one, so that for each complete cycle, as determined by one complete revolution of the cam block, the wrapping head makes three complete revolutions. Thus upon each depression of the treadle by the operator the twine will be passed three times around the package, knotted, severed, and the end of the twine connected to the package withdrawn from the twine catcher 128.

Upon the completion of each twine tying operation the package may be moved slidably lengthwise of the channel package support, and successive wraps placed about the package at desired intervals, as at 134 and 135, Fig. 2.

The present application relates particularly to a modification shown in Figs. 8 to 11 hereof, and which is best explained in conection with Figs. 1 to 7.

While thus limited as to length and diameter of package capacity, this embodiment of my invention has other features and advantages which materially enhance its value for certain uses. As examples of a few of such uses, I mention: the tying in bundles of insulation tubes known to the radio art as "spaghetti," or extruded explosive material such as that known as "cordite," and the wrapping in bundles of strands of material such as the material known as "nylon" bristles.

The modification of Figs. 8 to 11, inclusive, is of a type which may necessarily use a strong, relatively heavy twine or line or light rope in performing the wrapping operation, and for that reason the wrapping head and its supported supply of twine may be relatively heavy.

Many of the parts of the present modification, however, are similar to those of the embodiment of Figs. 1 to 7, inclusive; and for such parts I employ the same numbers as those used to designate like parts in Figs. 1 to 7 inclusive, but adding thereto the suffix "b."

The forces of inertia both in initiating and terminating a wrapping operation are relatively great, and in order to avoid imposing too great a strain on the clutch and associated driving mechanism in beginning a wrapping operation, I connect the hub of the sprocket 57b to the wrapping head drive gear 49b by a lost motion arrangement which is illustrated clearly in Figs. 8 and 11.

The hub of the sprocket 57b is journaled on the shaft of the wrapping head drive gear 49b so that it would be free to rotate thereon were it not for the fact that an axially projecting tongue 179 from the sprocket 57b is mounted within a notch 180 in a collar 183 secured to the shaft of the wrapping head drive gear as by means of a taper pin 184. The notch is somewhat greater in its arcuate dimension than the tongue so as to permit a limited relative rotative movement between the sprocket and the shaft which may be approximately 15 degrees. I have found that such freedom for movement between the shaft and the sprocket permits the mechanisms up to the sprocket to acquire sufficient momentum on the initiating of a wrapping movement so that when the lost motion arrangement above described causes the shaft to engage the sprocket 57b, the remaining driven mechanism from the sprocket 57b up to and including the wrapping head and associated parts will be energized with much less strain on the clutch and drive belt than is the case where no such lost motion arrangement is provided.

The structure of the major operating portions of the modification illustrated in Figs. 8 to 11, inclusive, that is, the motor drive arrangement, the cam, knotter, and wrapping head, are substantially the same as those illustrated in the embodiment of Figs. 1 to 7, inclusive, so that no detailed description will be required for a complete understanding of these parts.

In order to avoid back-lash and overrun of the wrapping head 66b upon the completion of a wrapping cycle, a brake mechanism is provided which acts on the driven sprocket 63b and is transmitted to the winding head through the chain 64b.

The brake comprises a metal disc 185, having a facing 182 of suitable material, such as brake lining material, see Figs. 8 and 10, slidably mounted on a bushing 186 which is free to rotate within the hub 187 of the disc. The bushing in turn is mounted on the clutch shaft 35b which also has journaled thereon the sprocket 63b. A collar 188 is secured to the shaft 35b by means of a set screw 190 to retain the bushing against axial movement as illustrated in Fig. 10, and to cause the bushing to bear against a ball thrust bearing 193 which is mounted between the left hand or inner end of the bushing 186 and a main frame member 22b. The shaft 35b is journaled in a bushing 194 mounted in the main frame member 22b.

The hub 187 of the disc has a pair of trunnions 189 which engage openings in the bifurcated ends of a bell crank lever 195 pivoted in a bracket 196 secured to the frame. The opposite end 197 of the bell crank lever has an opening therein in which a brake actuating rod 198 is mounted slidably. A spring-support cup 199 is supported on the end 197 of the bell crank lever, and a coil spring 200 is held in compression between this cup and a second, oppositely disposed cup 201 which is retained in adjusted position on the rod by means of a slidable sleeve 202 and a pair of adjusting nuts 203 and 204.

The upper end of the brake adjusting rod 198 is pivotally connected as at 205 to a cam-actuated arm 206 which is pivoted as at 207 to the frame. A roller 208 is mounted on a stud 209 which is secured to the mutilated gear 46b and is adapted to depress the arm 206 upon the completion of a wrapping cycle, as determined by a complete revolution of the mutilated gear which is keyed to the same shaft as the main cam block (see 44 of Fig. 3). The depressing of the arm 206 forces the rod 198 downward and, through the compressive action of the coil spring 200, moves the bell crank lever 195 pivotally in a counterclockwise direction from the position illustrated in Fig. 10. The bell crank lever being pivotally connected to the machine frame through bracket 196, the movement thereof forces the braking surface 182 against the side of the sprocket 63b to arrest the rotation of the wrapping head. The thrust of the brake against the side of the sprocket is received by the ball bearing 193 and is transmitted to the frame through the aforementioned bracket 196.

A pair of large, deeply grooved, package-support rollers 210 and 211 are mounted on brackets 212 and 213 extending outwardly beyond the ends of the frame to support heavy bundles of material which may be placed upon these rollers and extending through the central opening of the wrapping head. The position of a package so supported, and which may be assumed for example to be a bundle of copper tubes 133b is indicated in dotted lines in Figs. 8 and 9. A pair of side brackets 214 and 215 are bolted to the top of the frame to extend upwardly therefrom, one being mounted in each of the planes defined by the ends of the rollers 210 and 211, to prevent material supported upon the rollers from spreading out laterally before an initial wrap has been tied around the package to secure it into a compact unit.

This arrangement for supporting and feeding bundles of long heavy material to and through this machine has a definite advantage in handling the frequently rapid production of the material which this machine is designed to handle. For example, material may be taken from a conveyor, not shown, located at one end of the machine, for instance, the left end as illustrated in Fig. 8, and can be rapidly bunched on the rollers between the brackets 214 and 215 and then can be fed through the machine toward the right, stopping it momentarily at required intervals to operate the wrapping mechanism. When the last wrapping operation is completed, the finished bundle can be rolled out of the machine to the right and transported to storage or shipment as required.

While I have illustrated preferred embodiments of my invention, many modifications may be made without departing from the spirit of the invention, and I do not wish to be limited to the precise details of construction set forth, but desire to avail myself of all changes within the scope of the appended claims.

I claim:

1. In a machine for wrapping relatively heavy packages, said machine having an annular wrapping head, a driving motor, a drive train comprising a plurality of gears, drive chains and sprockets operatively connecting said motor to said wrapping head, clutch means interposed in said drive train, clutch-actuating means for effecting alternate engagement and release of said clutch means, and a cam mounted on one of said drive train elements for coaction with said clutch-actuating means automatically to release said clutch means at a predetermined point in the rotation of said cam; a mechanically actuated brake comprising a brake disc journaled concentrically with and laterally adjacent to one of the drive train members, a brake actuating element mounted to operate synchronously with the cam, and means operatively interconnecting the brake actuating element and the brake to move the disc into braking engagement with its adjacent drive train member, upon the completion of a predetermined cycle of operation of said cam and associated parts.

2. In a machine for wrapping relatively heavy packages, said machine having an annular wrapping head, a driving motor, a drive train comprising a plurality of gears, drive chains and sprockets operatively connecting said motor to said wrapping head, clutch means interposed in said drive train, clutch-actuating means for effecting alternate engagement and release of said clutch means, and a cam mounted on one of said drive train elements at a position to coact with said clutch-actuating means automatically to release said clutch means at a predetermined point in the rotation of said cam; a mechanically actuated brake comprising a brake disc journaled concentrically with and laterally adjacent to one of the drive train members, a bell crank lever having one end thereof in operative engagement with the disc, a spring thrust member mounted on the other end of the bell crank lever, a second lever adjustably secured to the spring thrust member, and operating means mounted to operate synchronously with the cam to engage the second lever and force the spring thrust member to pivot said bell crank lever, thereby to move the brake disc into braking engagement with the drive train member upon the completion of a predetermined cycle of operation of said cam and associated parts.

3. In a machine for wrapping relatively heavy packages, said machine having an annular wrapping head, a driving motor, a drive train comprising a plurality of gears, drive chains and sprockets operatively connecting said motor to said wrapping head, clutch means interposed in said drive train, clutch-actuating means for effecting alternate engagement and release of said clutch means, and a cam mounted on one of said drive train elements for coaction with said clutch-actuating means automatically to release said clutch means at a predetermined point in the rotation of said cam; a lost motion device interposed between a driving and a driven element of said train to free the driving element for partial rotation independently of the driven element upon engagement of said clutch means to free the clutch means initially from the load imposed through the driven element.

4. In a machine for wrapping relatively heavy packages, the combination of a support with an annular wrapping head adapted to carry a reach of twine around a package, a driving motor, operative connecting mechanism between said driving motor and said wrapping head for rotating the wrapping head a predetermined number of times upon each connection of the driving motor, clutch means included in said connecting mechanism for disconnecting the driving motor from said wrapping head, means for effecting disconnecting operation of the clutch means upon completion of the wrapping, and brake means operatively connected to said wrapping head to stop the wrapping head when the wrapping is completed.

5. In a machine for wrapping relatively heavy packages, the combination of a support with an annular wrapping head adapted to carry a reach of twine around a package, a driving motor, operative connecting mechanism between said driving motor and said wrapping head for rotating the wrapping head a predetermined number of times upon each connection of the driving motor, mechanically actuated means included in said connecting mechanism for disconnecting the driving motor from the wrapping head, means for effecting disconnecting operation of the mechanically actuated means upon completion of the wrapping, and brake means operatively connected to said wrapping head to stop the wrapping head when the wrapping is completed, said brake means being actuated at a predetermined time by means which is operated simultaneously with said wrapping head.

6. In a machine for wrapping relatively heavy packages, the combination of a support with an annular wrapping head adapted to carry a reach of twine around a package, a driving motor, operative connecting mechanism between said driving motor and said wrapping head for rotating the wrapping head a predetermined number of times upon each connection of the driving motor, clutch means included in said connecting mechanism for disconnecting the driving motor from the wrapping head, means for effecting disconnecting operation of the clutch means upon completion of the wrapping, brake means operatively connected to said wrapping head to stop the wrapping head when the wrapping is completed, a package support located to support a package in such position that the twine will be wrapped around the package by said head, and conveying means carried by the opposite sides of said support and adapted to convey an elongated package across said package support.

7. In a machine for wrapping relatively heavy packages, the combination of a support with an annular wrapping head adapted to carry a reach of twine around a package, a driving motor, operative connecting mechanism between said driving motor and said wrapping head for rotating the wrapping head a predetermined number of times upon each connection of the driving motor, clutch means included in said connecting mechanism for disconnecting the driving motor from the wrapping head, means for effecting disconnecting operation of the clutch means upon completion of the wrapping, brake means operatively connected to said wrapping head to stop the wrapping head when the wrapping is completed, a package support located to support a package in such position that the twine will be wrapped around the package by said head, and conveying means carried by the opposite sides of said support and adapted to convey an elongated package across said package support, said conveying means comprising flanged rollers, the flanges projecting upwardly for guiding the sides of an elongated article to be wrapped.

8. In a machine for wrapping relatively heavy packages, the combination of a support with an annular wrapping head adapted to carry a reach of twine around a package, a driving motor, operative connecting mechanism between said driving motor and said wrapping head for rotating the wrapping head a predetermined number of times upon each connection of the driving motor, clutch means included in said connecting mechanism for disconnecting the driving motor from the wrapping head, means for effecting disconnecting operation of the clutch means upon completion of the wrapping, brake means operatively connected to said wrapping head to stop the wrapping head when the wrapping is completed, a package support located to support a package in such position that the twine will be wrapped around the package by said head, conveying means carried by the opposite sides of said support and adapted to convey an elongated package across said package support, said conveying means comprising flanged rollers, the flanges projecting upwardly for guiding the sides of an elongated article to be wrapped, and a pair of auxiliary bunching brackets carried by said support and adapted to hold an assembly of loose, elongated articles in bunched relation until they are wrapped with twine.

9. In a machine for wrapping relatively heavy packages, the combination of a support with an annular wrapping head adapted to carry a reach of twine around a package, a driving motor, operative connecting mechanism between said driving motor and said wrapping head for rotating the wrapping head a predetermined number of times upon each connection of the driving motor, means for automatically effecting disconnection of the driving motor upon completion of the wrapping, and brake means operatively connected to said wrapping head to stop the wrapping head when the wrapping is completed, said means for disconnecting the driving motor comprising a clutch, and said operative connecting mechanism including a lost motion arrangement whereby the clutch may become fully engaged before the wrapping head is driven.

10. A machine for wrapping elongated packages comprising a frame, a wrapping ring rotatably mounted on the frame, a package support passing through the wrapping ring, a motor for driving said wrapping ring, and operative mechanical connections between said motor and said driving ring, said operative mechanical connections including a clutch and a lost motion device, whereby the clutch may become fully engaged before the lost motion device takes hold and drives the wrapping ring.

11. A machine for wrapping elongated packages comprising a frame, a wrapping ring rotatably mounted on the frame, a package support passing through the wrapping ring, a motor for driving said wrapping ring, operative mechanical connections between said motor and said driving ring, said operative mechanical connections including a clutch and a lost motion device, whereby the clutch may become fully engaged before the lost motion device takes hold and drives the wrapping ring, and means for automatically disconnecting said clutch from driving said wrapping ring when a predetermined number of wraps have been made about the package.

12. A machine for wrapping elongated packages comprising a frame, a wrapping ring rotatably mounted on the frame, a package support passing through the wrapping ring, a motor for driving said wrapping ring, operative mechanical connections between said motor and said driving ring, said operative mechanical connections including a clutch and a lost motion device, whereby the clutch may become fully engaged before the lost motion device takes hold and drives the wrapping ring, and a brake acting upon said wrapping ring and adapted to bring it to a stop, the said brake being automatically applied after the clutch has been disconnected.

13. A machine for wrapping elongated packages comprising a frame, a wrapping ring rotatably mounted on the frame, a package support passing through the wrapping ring, a motor for driving said wrapping ring, operative mechanical connections between said motor and said driving ring, said operative mechanical connections including a clutch and a lost motion device, whereby the clutch may become fully engaged before the lost motion device takes hold and drives the wrapping ring, and a brake acting upon said wrapping ring and adapted to bring it to a stop, the said brake being automatically applied after the clutch has been disconnected, by means of a roller, operated simultaneously with said wrapping ring.

14. In a machine for wrapping relatively heavy packages, said machine having an annular wrapping head, a driving motor, a drive train comprising a plurality of interconnecting elements operatively connecting said motor to said wrapping head, clutch means interposed in said drive train, clutch-actuating means to effect alternate engagement and release said clutch means, means mounted on one of said drive train elements to effect automatic release of said clutch-actuating means at a predetermined point in the rotation of said mounted means, brake means journaled concentrically with and laterally adjacent to one of the drive train elements, a brake-actuating element mounted to operate synchronously with the mounted means to release said clutch-actuating means, and means operatively interconnecting the brake-actuating element and the brake means to move the brake means into braking engagement with its adjacent drive train element upon the completion of a predetermined cycle of operation of said mounted means and associated parts.

BENJAMIN H. BUNN.

REFERENCES CITED

The following references are of record in the file of this patent:

UNITED STATES PATENTS

| Number | Name | Date |
| --- | --- | --- |
| 1,606,290 | Bunn | Nov. 9, 1926 |
| 1,994,453 | Bunn | Mar. 19, 1935 |
| 2,372,763 | Bunn | Apr. 3, 1945 |